L. E. YOUNIE.
FRICTION CLUTCH MECHANISM.
APPLICATION FILED MAR. 8, 1916.
1,221,127.
Patented Apr. 3, 1917.
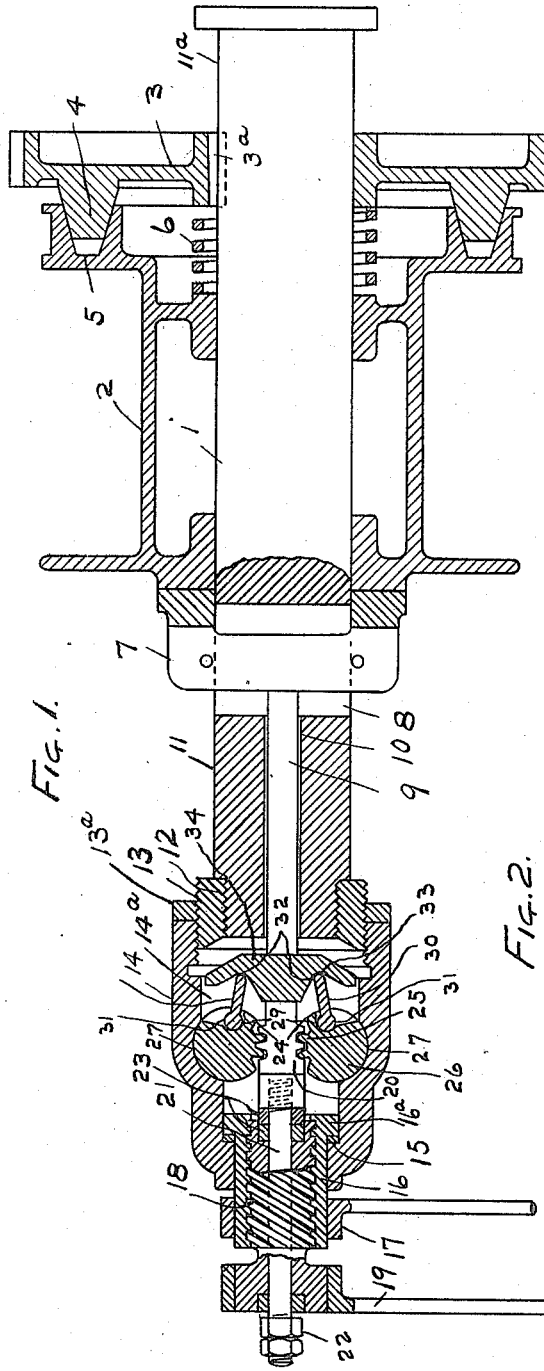
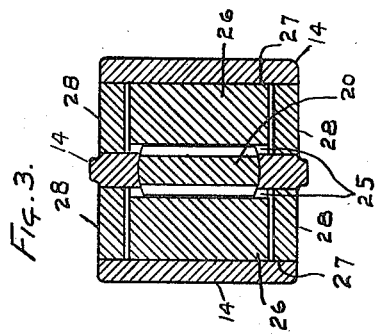
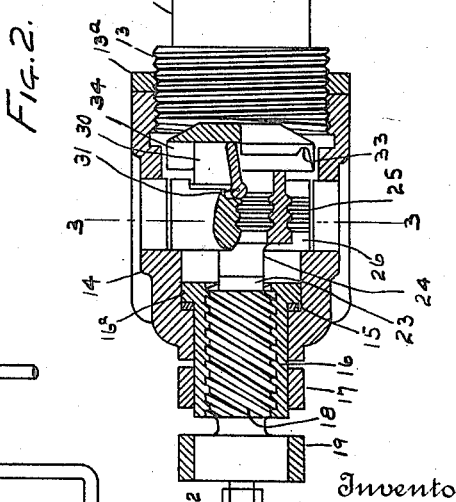

UNITED STATES PATENT OFFICE.

LEWIS EDWARD YOUNIE, OF PORTLAND, OREGON.

FRICTION-CLUTCH MECHANISM.

1,221,127.  Specification of Letters Patent.  Patented Apr. 3, 1917.

Application filed March 8, 1916. Serial No. 82,828.

*To all whom it may concern:*

Be it known that I, LEWIS E. YOUNIE, a citizen of the United States, residing at Portland, in the county of Multnomah and State of Oregon, have invented new and useful Improvements in Friction-Clutch Mechanisms, of which the following is a specification.

This invention relates to friction clutch mechanisms and consists in certain improvements in the construction thereof as will be hereinafter fully described and pointed out in the claims.

More particularly the invention relates to thrust devices for friction clutches, especially such friction clutches as are used in connection with drums of logging or hoisting engines, such clutch actuating mechanisms being ordinarily termed friction devices.

The invention is a development in some respects of the construction shown in the patent issued to Bert C. Ball and myself, Feb. 22, 1916, #1,172,923.

The invention is illustrated in the accompanying drawings as follows:—

Figure 1 shows a central section through the drum and attached friction device.

Fig. 2 a somewhat similar section of the friction device showing the friction actuating mechanism from a slightly different angle.

Fig. 3 a section on the line 3—3 in Fig. 2.

1 marks the drum shaft, 2 the drum, 3 the gear for driving the drum, said gear being fixed on the shaft 1 by a key $3^a$, 4 the gear cone, 5 the friction surface on the drum, 6 a spring for releasing the drum, 7 a thrust key arranged in a slot 8 in the shaft 1, 9 a thrust pin extending through the axial opening 10 in the shaft, and 11 a portion of the shaft 1 used for a bearing, the portion $11^a$ forming the opposite bearing.

It will be noted that the thrust pin 9 communicates the thrust movement through the portion of the shaft forming the bearing surface 11.

The end of the shaft is provided with a screw thread 12 on which is arranged a collar 13. The collar 13 is set up against a shoulder at the inner end of the screw thread and thus becomes practically a part of the shaft. The friction device head 14 is screwed onto the collar or bushing 13 and locked thereon by a jam nut $13^a$. The head has an axial opening $14^a$ terminating in an internal shoulder 15. The thrust nut 16 has an external shoulder $16^a$ which opposes the shoulder 15. The thrust nut 16 is locked against rotation by a bar 17 which is fixed on the nut 16. A thrust screw 18 operates in the nut 16. It is provided with the operating handle 19. A rack 20 is arranged in the center of the bore $14^a$ and the pin 21 extends from the rack through the screw 18. Nuts 22 are arranged on the outer ends of the pin so as to hold it in axial relation to the nut. Washers 23 are arranged between the end of the rack and the screw 18, the screw being preferably provided with a socket to receive the washers. The rack 20 meshes the gear segments 25 arranged on one face of the pins 26. The pins 26 are mounted in transverse cylindrical openings 27 in the head 14. The openings 27 are closed by the caps 28 (see Fig. 3).

Bearing sockets 29 are arranged in the front faces of the pins 26 and thrust links 30 have one end provided with bearing surfaces 31 which are seated in sockets 29. The opposite ends of the links 30 have bearing ends 32 which are seated in the sockets 33 in a thrust block 34. The thrust block 34 is arranged at the end of the thrust pin 9.

In the operation of the device, the rack 20 is forced forward by the screw 18, the screw 18 being operated by the lever 19. The forward movement of the rack rotates the pins 26 and thus swings the sockets 29 and consequently the links 30 into line with the centers of the pins and the thrust block. It will be noted that the bearing sockets 29 are eccentric and that this swinging of the pins results in a toggle action, the power increasing as the thrust links are brought to alinement. This method of converting the rotating movement of the pins to the thrust block is accomplished with very little friction and with a great deal of power just at the point where power is needed. The device on the other hand has sufficient action so as to assure a complete release of the friction clutch surfaces when actuated.

The clutch block while shown practically filling the opening $14^a$ may be of any shape adapted to receive a thrust link and separate from or integral with the pin 9. The links 30 would be brought a little beyond the alinement so that further rocking of the pins 26 is blocked either by the rack 20 contacting the block 34 or by a stop such as 24 on the pins engaging the thrust links. After the thrust links are brought sufficiently near the center to lock them, pressure may be released from the screw 18 so that in the further rotation of the friction device there is no thrust on the thrust nut 16. The device is readily released by a slight retracting movement of the screw 18. The links 30 are elongated in the line of the bearings so that there is ample bearing surface and metal to receive the thrust.

What I claim as new is:—

1. In a friction clutch mechanism, the combination of a shaft; a clutch on the shaft; and a friction device for actuating the clutch comprising a thrust block; a head having a thrust surface opposed to the block; a pin rocking on a transverse axis having a bearing on said thrust surface; a thrust link interposed between the pin and thrust block and having an eccentric bearing on the pin; and means operatig on the pin to rotate the pin.

2. In a friction clutch mechanism, the combination of a shaft; a clutch on the shaft; and a friction device for actuating the clutch comprising a thrust block; a head having a transverse cylindrical bore; a cylindrical rocking pin having a socket bearing at one side and arranged in said transverse cylindrical bore; and a thrust link interposed between the pin and the block, one end of the link being seated in said bearing on said pin.

3. In a friction clutch mechanism, the combination of a shaft; a clutch on the shaft; and a friction device for actuating the clutch comprising a thrust block; a head having a thrust surface opposed to the block; a rocking pin having a bearing on said surface, said pin having an elongated eccentric bearing socket therein; and a thrust link interposed between the pin and the block, said link being seated in said bearing on said pin.

4. In a friction clutch mechanism, the combination of a shaft; a clutch on the shaft; and a friction device for actuating the clutch, comprising a thrust block; a head having a thrust surface opposed to the block; a pin rocking on a transverse axis having a bearing on said thrust surface; a thrust link interposed between the pin and thrust block and having an eccentric bearing on the pin; means operating on the pin to rotate the pin to carry the link near a line running from the center of the pin to the point of engagement between the link and the block; and a stop for limiting a further movement of the pin.

5. In a friction clutch mechanism, the combination of a shaft; a clutch on the shaft; and a friction device for actuating the clutch comprising a thrust block; a head having thrust surfaces opposed to the block; rocking pins, one each side of the axis of the head, said pins rocking on axes transverse to the axis of the head; thrust links having eccentric bearings on said pins and interposed between said pins and said block; and means operating on opposing sides of the pins for rocking the pins to actuate the clutch.

6. In a friction clutch mechanism, the combination of a shaft; a clutch on the shaft; and a friction device for actuating the clutch comprising a thrust block; a head having an axial bore in which the block is mounted and having transverse bores, one each side of the axis of the head; rocking pins arranged in said transverse bores; thrust links having eccentric bearings on said pins and interposed between said pins and said block; and means operating on opposing sides of said pins for actuating said pins.

7. In a friction clutch mechanism, the combination of a shaft; a clutch on the shaft; and a friction device for actuating the clutch comprising a thrust block; a head having an axial bore in which the block is mounted and having transverse bores, one each side of the axis of the head; rocking pins arranged in said transverse bores; thrust links having eccentric bearings on said pins and interposed between said pins and said block; a thrust nut carried by the head; a thrust screw carried by the thrust nut; and means actuated by the thrust screw for actuating said pins.

In testimony whereof I have hereunto set my hand.

LEWIS EDWARD YOUNIE.

Copies of this patent may be obtained for five cents each, by addressing the "Commissioner of Patents, Washington, D. C."